US 010475321B2

(12) United States Patent
Jones et al.

(10) Patent No.: US 10,475,321 B2
(45) Date of Patent: Nov. 12, 2019

(54) CART WHEEL FAILURE DETECTION SYSTEMS AND METHODS

(71) Applicant: Walmart Apollo, LLC, Bentonville, AR (US)

(72) Inventors: Nicholaus A. Jones, Fayetteville, AR (US); Matthew Biermann, Fayetteville, AR (US); Steven Lewis, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 20 days.

(21) Appl. No.: 15/840,296

(22) Filed: Dec. 13, 2017

(65) Prior Publication Data

US 2018/0174421 A1 Jun. 21, 2018

Related U.S. Application Data

(60) Provisional application No. 62/434,652, filed on Dec. 15, 2016.

(51) Int. Cl.
*G01J 5/02* (2006.01)
*G08B 21/04* (2006.01)
*G01K 1/14* (2006.01)
*G01J 5/08* (2006.01)
*G01J 5/12* (2006.01)
*G01J 5/00* (2006.01)

(52) U.S. Cl.
CPC ........ *G08B 21/0469* (2013.01); *G01J 5/0022* (2013.01); *G01J 5/0859* (2013.01); *G01J 5/12* (2013.01); *G01K 1/143* (2013.01); *G01J 2005/0033* (2013.01)

(58) Field of Classification Search
CPC ............ G01J 2005/0033; G01J 5/0022; G01J 5/0859; G01J 5/12; G01K 1/143; G08B 21/0469
See application file for complete search history.

(56) References Cited

U.S. PATENT DOCUMENTS

| 3,854,336 | A | * | 12/1974 | Bibby | .................. | G01J 5/0022 374/124 |
| 4,960,251 | A | | 10/1990 | Nyman | | |
| 5,485,006 | A | * | 1/1996 | Allen | ..................... | A47F 9/045 250/222.1 |
| 8,930,065 | B2 | | 1/2015 | Argue | | |
| 9,134,185 | B2 | * | 9/2015 | Mian | ..................... | G01J 1/4228 |
| 9,322,658 | B2 | | 4/2016 | Hannah | | |

(Continued)

FOREIGN PATENT DOCUMENTS

| CN | 102745025 B | 9/2014 |
| WO | WO 2013142896 A1 | 10/2013 |
| WO | WO 2016055815 A1 | 4/2016 |

*Primary Examiner* — David P Porta
(74) *Attorney, Agent, or Firm* — Patterson Thuente Pedersen, P.A.

(57) ABSTRACT

Embodiments relate to systems in which one or more infrared cameras or sensors are used to measure heat related to the wheels of carts, such as shopping carts. Wheels with bad bearings, that wobble, or that have other issues preventing normal operation tend to generate more heat than wheels that are in good working order, such that an infrared camera or sensor directed at wheel height (e.g., about 2-3 inches off the floor) can detect wheel issues by detecting heat emitted by the wheels.

24 Claims, 3 Drawing Sheets

(56) References Cited

U.S. PATENT DOCUMENTS

| | | | |
|---|---|---|---|
| 2004/0093650 A1* | 5/2004 | Martins | B25J 5/007 |
| | | | 180/167 |
| 2011/0109456 A1* | 5/2011 | Bergman | G08B 13/2402 |
| | | | 340/568.5 |
| 2013/0044914 A1* | 2/2013 | Rai | G06K 9/3216 |
| | | | 382/103 |
| 2013/0223673 A1* | 8/2013 | Davis | G06K 9/78 |
| | | | 382/100 |
| 2014/0108195 A1 | 4/2014 | Stawar | |
| 2014/0167960 A1 | 6/2014 | Argue | |
| 2016/0009169 A1 | 1/2016 | Biderman | |

* cited by examiner

CART WHEEL FAILURE DETECTION SYSTEMS AND METHODS

RELATED APPLICATION

The present application claims the benefit of U.S. Provisional Application No. 62/434,652 filed Dec. 15, 2016, which is hereby incorporated herein in its entirety by reference.

TECHNICAL FIELD

The present disclosure relates generally to shopping carts and more particularly to systems and methods for monitoring shopping carts to detect pre-failure or failure of the wheels.

BACKGROUND

Shopping carts are a common feature in many stores. Carts are also used in shopping centers, airports, warehouses and other settings. Managing a fleet of carts can be difficult, as carts can develop bad wheel bearings, wobbly wheels and other issues requiring maintenance or replacement of a wheel assembly or entire cart. Identifying carts with wheel-related issues can be time-consuming and require hands on attention by store associates or other staff.

SUMMARY

Embodiments relate to systems and methods for cart wheel failure detection.

In one embodiment, a cart wheel failure detection system comprises at least one sensor arranged physically apart from a cart so as to detect heat emanating from each of a plurality of wheels of the cart, the at least one sensor configured to detect a unique cart identifier disposed proximate at least one of the plurality of wheels; a communication system configured to receive the unique cart identifier and sensor data of detected heat emanating from each of the plurality of wheels of the cart from the at least one sensor; and a microprocessor configured to receive the unique cart identifier and the sensor data of detected heat emanating from each of the plurality of wheels of the cart from the communication system, to compare the sensor data for each of the plurality of wheels to a predefined alert rule defining one or more threshold parameters indicative of pre-failure or failure of a cart wheel, and to transmit a wheel failure alert comprising the unique cart identifier if the sensor data for any one of the plurality of wheels satisfies the predefined alert rule.

In one embodiment, each of the one or more threshold parameters is selected from the group consisting of: a maximum temperature, a maximum rate of temperature increase, and a maximum similarity of the sensed data to a known heat distribution pattern.

In one embodiment, the microprocessor determines at least one of the one or more threshold parameters based on a baseline determined based on previously measured baseline sensor data of at least one operational cart In one embodiment, a method of detecting pre-failure or failure of a cart wheel comprises arranging at least one sensor physically apart from a cart; detecting heat emanating from each of a plurality of wheels of the cart by the at least one sensor; detecting a unique cart identifier disposed proximate at least one of the plurality of wheels by the at least one sensor; comparing data for each of the plurality of wheels from the at least one sensor to a predefined alert rule defining one or more threshold parameters indicative of pre-failure or failure of a cart wheel; and providing a wheel failure alert comprising the unique cart identifier if the data for any one of the plurality of wheels satisfies the predefined alert rule in the comparing.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
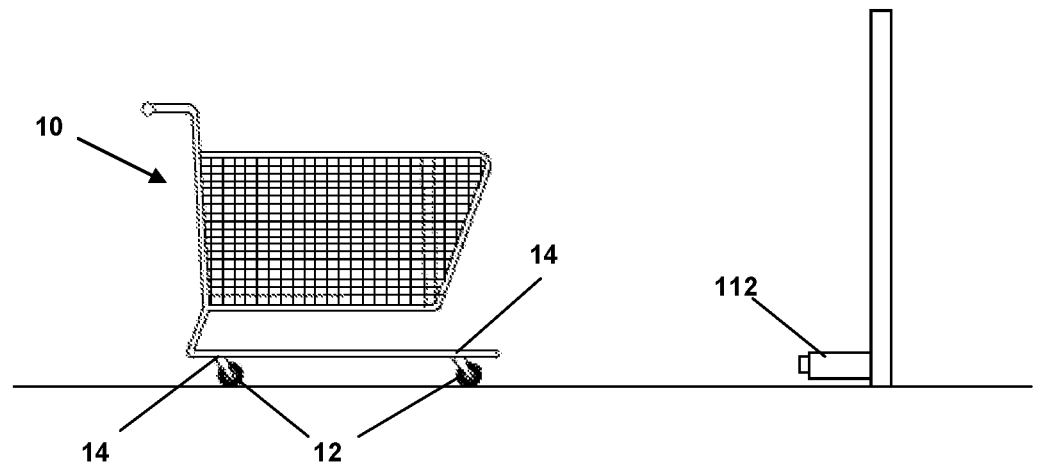
FIG. 1 is a diagram of a cart and infrared camera according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments relate to systems in which one or more infrared cameras or sensors are used to measure heat related to the wheels of carts, such as shopping carts. Wheels with bad bearings, that wobble, or that have other issues preventing normal operation tend to generate more heat than wheels that are in good working order, such that an infrared camera or sensor directed at wheel height (e.g., about 2-3 inches off the floor) can detect wheel issues by detecting heat emitted by the wheels.

A shopping cart 10 is depicted in FIG. 1. Shopping cart 10 comprises a plurality of wheels 12, typically four but sometimes more or fewer. Each wheel 12 is affixed to shopping cart 10 by a wheel assembly 14. The particular size, shaped and configuration of shopping cart 10 can vary from that depicted as an example in FIG. 1. Additionally, other types of carts or mobile transport units, such as luggage carts, flatbed carts, and other units, can be used in embodiments instead of a shopping cart, though a shopping cart will be used an example herein throughout. Though a retail store also will be used herein as an example setting in which carts are used, other settings include shopping centers, airports, warehouses, greenhouses, hospitals and medical facilities, laundry facilities, hotels, and many others.

Each wheel assembly 14 typically comprises a wheel bearing (not visible in FIG. 1) affixed to an axle shaft. The wheel bearing enables wheel 12 to rotate on the axle shaft during movement of cart 10. Wheel bearings can fail for a variety of reasons, including age, lack of lubrication, exposure to moisture, and exposure to heat or excessively cold temperatures. Wheels 12 themselves also can fail for a variety of reasons other than wheel bearing failure, such as failure of another component of wheel assembly 14 or debris (e.g., dirt, string, hair, rocks, paper, plastic) becoming caught in wheel 12 or wheel assembly 14 and preventing rotation, among other potential issues. A failing wheel bearing or other issue affecting wheel 12 and/or wheel assembly 14 can cause wobbling of wheel 12, increased friction among components in wheel 12 and/or wheel assembly 14, increased resistance to rotation of wheel 12, or other problems that generate heat or otherwise raise the temperature of wheel 12 or wheel assembly 14 beyond a normal increase in temperature associated with friction between an outer surface of each wheel 12 and the floor or other surface on which cart 10 is pushed.

Detecting these higher-than-normal temperatures increases can identify carts 10 in need of service before wheels 12 or other components fail completely. Once a failure occurs, cart 10 becomes more difficult to move and manage, and taking an ailing cart out of service before total failure avoids customers using and becoming frustrated by carts 10 that are difficult to maneuver or become inoperative once they are already filled with items.

Figure 2:
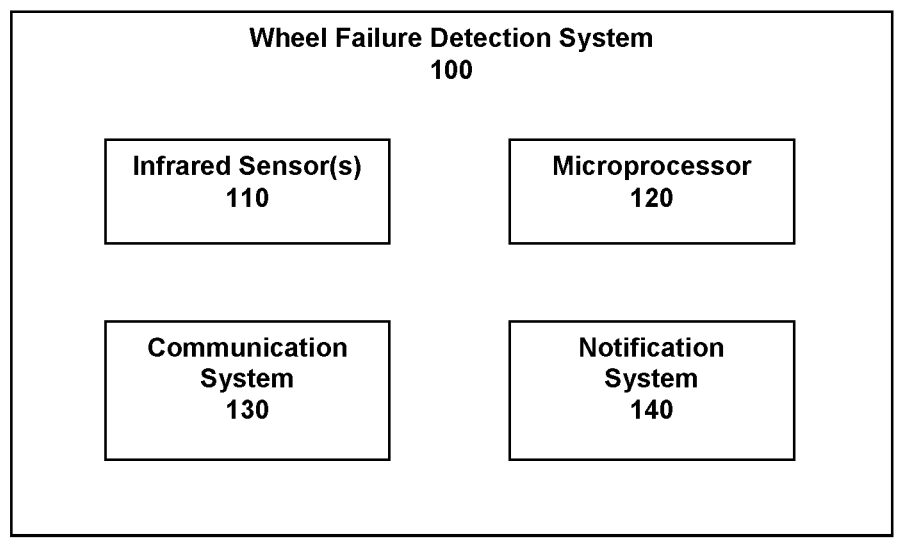
FIG. 2 is a block diagram of a cart wheel failure detection system according to an embodiment.

Therefore, in embodiments a wheel failure detection system 100 (see FIG. 2) comprises at least one infrared (IR) sensor 110 configured to detect IR radiation emitted by at least one wheel 12 of cart 10. IR sensors 110 operate by detecting heat energy emitted by objects in the form of radiation. IR wavelengths typically are not visible to the naked eye but can be detected by IR sensors 110. This detected thermal radiation can be converted by the IR sensor 110 to an electrical signal and displayed as a temperature, enabling temperatures of objects to be sensed from a distance without contact. In other embodiments, other types of temperature sensors capable of sensing heat or temperature from a distance can be used instead of or in addition to IR sensors, though IR sensors will be used in examples given herein throughout.

In one embodiment, IR sensor 110 comprises or is part of an IR camera 112 (see FIG. 1), which can measure the temperature at many different points in a relatively large area and produce a two-dimensional image, or thermogram, in which each pixel represents a temperature. IR cameras 112 can be useful in embodiments for measuring the temperatures of multiple wheels 12 of multiple carts 10 in an area, such as a cart corral, at the same time. In embodiments, one or more IR cameras 112 can be mounted in or near a cart corral area, such as inside a store near the entrance where carts 10 are collected and made available to customers entering the store. In another embodiment, one or more IR cameras 112 can be mounted on a cart collector, such as the type often used in airports for luggage carts that are rented, with a deposit returned to the user upon returning and securing the luggage cart in the cart collector, which only releases the cart for use upon successful payment of the rental fee. In still other embodiments, one or more IR cameras 112, or a sensor network of IR sensors 110, can be mounted in areas in which carts 10 are often used, such as at point-of-sale (POS) or cashwrap areas, throughout a store in aisles, floors, shelves, modulars, or walls, or in various other locations. In general, however, IR cameras 112 or IR sensors 110 are mounted physically apart or separate from cart 10 and typically less than 12 inches above the floor or other surface, such as less than 6 inches above the floor or other surface, for example about 2-3 inches above the floor or other surface.

In embodiments in which system 100 comprises a plurality of IR cameras 112 distributed throughout an area, such as within a store, parking area, airport or other facility, each IR camera 112 can comprise a location identifier such that if a problem cart 10 is detected by a particular IR camera 112, information regarding a current location of the mobile cart 10 can be determined from a known location of the IR camera 112 that sensed a problem with the cart 10.

In these and other embodiments, each cart 10 also comprises a unique identifier such that IR camera 112 or another component of system 100 can identify a particular cart needing attention. In one embodiment, each cart 10 comprises a unique identifier that can be identified by IR camera 112, such as an etched, engraved or otherwise patterned identifier or an IR watermark that can be read IR camera 112. Such an identifier can comprise metal or another suitable material that enables it to be read by based on heat emitted from it. In other embodiments, each cart 10 comprises a bar code, radio frequency identification (RFID), quick response (QR) code, alpha-numeric, or other machine-readable identifier that can be read by a corresponding scanner or reader of system 100 (not depicted), such as an RFID reader, QR scanner, alpha-numeric reader or camera, or other suitable device. In some embodiments, a single identifier is provided on cart 10, while in other embodiments each wheel 12 of cart 10 comprises a wheel identifier such that a defective wheel can be quickly localized (e.g., right front wheel, left rear wheel, etc.).

In other embodiments, the unique identifier can, additionally or alternatively, be a time stamp of when IR camera 112 viewed the wheel. This approach can be used, for example, in embodiments in which IR camera 112 is arranged at a cart corral or other cart collection area. The last cart viewed could be determined or estimated to be the last (or one of the last) carts put in the corral, such that the cart can be identified by an associate or other personnel.

Sensed data from IR sensor 110 (e.g., IR camera 112), as well as data from readers or scanners in embodiments of system 100 in which these devices are used to identify cart 10 and/or a wheel 12, is provided to microprocessor 120. In one embodiment, microprocessor 120 is local to IR sensor 110. In another embodiment, microprocessor 120 is remote from IR sensor 110 and communicatively coupled therewith by communication system 130. Though microprocessor 120 and IR sensor 110 can be remote in embodiments in which a single IR camera 112 is used, it may be more common for microprocessor 120 to be remote from IR sensor 110 in embodiments in which system 100 comprises a plurality of IR sensors 110, in the form of a plurality of IR cameras 112, distributed throughout a store, parking facility, airport or other area. This enables a single, central microprocessor 120 to communicate with and manage data and information from the plurality of IR cameras 112 via communication system 130.

Communication system 130 can comprise a wired, wireless or hybrid wired/wireless system in various embodiments. Whether communication system 130 is wired, wireless or hybrid can depend on the particularities of various implementations of system 100, such as the size of the area in which IR cameras 120 are distributed, the number of IR cameras 112 in system 100, the physical conditions of the space in which system 100 is implemented (e.g., buildings with metal barriers may not enable wireless communications to be used reliably), the distances between IR cameras 112 and microprocessor 120, the costs associated with installing one or another type of communication system, etc. In one embodiment, communication system 130 comprises an internal WiFi (or other wireless communication) system, enabling all of the IR cameras 112 and one or more microprocessors 120 in a store or facility to communicate with one another wirelessly. In another embodiment, a plurality of IR cameras 112 is hardwired with microprocessor 120. In yet another embodiment, some IR cameras 112 are coupled with microprocessor 120 wirelessly and other IR cameras 112 are coupled with microprocessor 120 by wires. Still other embodiments are possible, such as ones in which communications between IR cameras 112 are wireless to a collector device, which in turn passes the communications to microprocessor 120 by wire.

In embodiments in which system 100 comprises an additional reader or scanner to obtain identification information from cart 10, communication system 130 also can provide a communicative coupling between the additional reader or scanner and microprocessor 120.

Communication system 130 is configured to convey sensor data from IR sensor(s) 110 (e.g., IR camera 112) to microprocessor 120. Microprocessor 120 then analyzes the sensor data to determine whether it indicates that any wheel 12 of a shopping cart 10 is in pre-failure or failure. In one embodiment, this analysis comprises comparing temperature data obtained for each wheel 12 with one or more predefined threshold parameters or rules that are indicative of pre-failure or failure of a shopping cart wheel 12.

One type of predefined threshold parameter can be a scalar temperature threshold, which can be a fixed temperature (e.g., 80 degrees F.) or a variable threshold determined based on ambient temperature. For example, some carts may be used in hot climates in which the ambient temperature may be 80 degrees F. or more, such that the threshold used by microprocessor 120 is programmed to be at least n degrees F. greater than an ambient temperature measured at the same time. In embodiments, n can be at least 5 degrees, at least 10 degrees, or more or fewer degrees. This ambient temperature can be detected by a separate sensor in system 100, or the ambient temperature can be determined from data already received IR sensor 110. For example, as previously mentioned thermograms can be constructed from IR sensor data, and in embodiments microprocessor 120 can determine an ambient or average temperature from a thermogram or data collected in an area around wheel 12. In yet another embodiment, temperatures of different wheels 12 on the same cart 10 can be compared, and if the variation is more than n degrees, the cart 10 can be flagged for attention. Still other methodologies can be used in various embodiments.

A temperature threshold parameter can be determined based on a baseline measurement. For example, system 100 can be calibrated by determining an average operating temperature of wheels 12 when carts are in use. This can be helpful because wheels 12 may experience more friction on some surfaces or under some loads, or the environmental characteristics of an area in which system 100 is used can vary widely, such as a snowy area in January versus a tropical area in July. In such an embodiment, a plurality of carts 10 with operational, non-failing wheels can be used in real-world conditions, and IR sensors 110 and microprocessor 120 can collect data. From this data, a baseline average (or, alternately, a median) temperature of wheels 12 in use can be determined and used to select an appropriate threshold parameter. In one embodiment, microprocessor 120 can automatically select an appropriate threshold parameter given the average temperature. In another embodiment, a user can manually select a threshold from the average or median temperature determined in the calibration procedure.

In still another embodiment, heat distribution patterns, as indicated by differential or temperature gradients on individual wheels, can be sensed and analyzed. A predefined baseline can therefore include automatically detected, or user defined, areas of interest for heat distribution. For example, if one portion of the rubber or tire portion of the wheel is much hotter than other portions of the wheel, this could indicate that this portion of the wheel is experiencing increased friction from the wheel being out of alignment or having some other issue cause irregular rubbing. Therefore, high temperatures at the sides of a wheel 12 relative to the temperature at the center plane can indicate a wheel that exhibits excess shaking or wobble. In embodiments, a user can define areas of interest for heat distribution pattern detection, and areas of interest can also be determined automatically by analyzing thermogram data to determine baseline heat distributions. A similar analysis could detect uneven or premature wear of the rubber or another portion of one or more of the wheels.

Where baseline heat distribution patterns are defined, threshold parameters can be based on the temperature within a region, and/or the difference between the temperatures of a plurality of regions. As with temperature thresholds, threshold parameters for pattern detection can be automatically determined based on measurements of operational, non-failing wheels, ambient temperatures, and manual user input. In embodiments, a scalar distance value can be calculated based on the amount of difference between the measured heat distribution pattern and the baseline heat distribution pattern(s). This scalar value can, as an example, indicate the likelihood that the measured wheel is experiencing a problem. A threshold parameter can therefore be set to indicate distance values that are high enough to warrant an alert.

In embodiments, system 100 can store the sensed heat data for each wheel 12. The change in each sensed heat value over time can be used to determine whether an alert should be issued. For example, a wheel that is experience a problem may show a very fast rise in temperature, even where the average temperature is below a given temperature threshold. A threshold parameter can therefore be set to indicate a maximum acceleration rate for detected temperature increases.

System 100 can further utilize stored data to determine information about the motion of wheels 12 in a cart 10. For example, as described above, various IR cameras 112 or other devices can provide location data for each cart 10. As carts 10 are detected at various locations within a facility, system 100 can store both the location data and a timestamp. In some embodiments, location and movement data can be provided directly by one or more components on the cart, such as a GPS or other localization device, and communicated to microprocessor 120. Location and movement data can also be derived by other techniques known in the art, such as independent customer location detection mechanisms. Combinations of location data sources can also be used, and the data can be provided to microprocessor 120 for processing.

The time and location data can be stored in a form that enables system 100 to determine how far the cart 10 has travelled over a given timeframe. System 100 can then infer the amount of time spent in motion and/or the average speed of motion. System 100 can further interpolate location data with assumed stopping locations and times; for example, system 100 can use data related to checkout line length to infer that at least some of the time between location checks was spend at a standstill. In embodiments, time and location data can be stored at an initial scan when a cart 10 leaves a corral or base station and used each time the wheels 12 of cart 10 are scanned. In other embodiments, time and location data can be stored each time heat sensor data is recorded, whether or not the heat sensor data itself is stored.

Wheel motion data can be used to establish or modify baseline or threshold parameters. For example, a threshold parameter for wheel temperature can be higher for a cart that is known to have travelled at high speed and/or for a long distance than for a cart that has been relatively stationary or moved more slowly. Wheel motion data can further be used to identify locations that are problematic in terms of increasing wheel wear. For example, an area with a rough floor surface, transition between floor surfaces, or an impediment that can strike the wheels, or an area that collects or is prone to debris (e.g. lint, thread, hair, paper, plastic) can be identified by detecting carts that exhibit increased signs of wear or wheel issues after travelling through the area. These areas then can be fixed, changed, or cleaned more frequently, as the case may be.

In embodiments, multiple baselines and threshold parameters can be used by system 100 to determine if an alert should be generated. The various thresholds parameters can further be weighted, such that certain values (for example, a very high average wheel temperature) are considered more likely to indicate potential wheel problems than others; for example, a small difference in temperature on an inside face of the wheel). The threshold parameters can also be combined via one or more logical alert rules, such that alerts can be generated if certain combinations of thresholds are exceeded. Other methodologies for determining whether to issue an alert based on threshold parameters and sensed heat data can be used.

When microprocessor 120 identifies a wheel 12 that exceeds the predetermined threshold(s), however those threshold(s) are determined or set, microprocessor 120 then obtains the cart (and, optionally, wheel) identifier, which as discussed above can be obtained via IR sensor 110 in some embodiments or a separate scanner or reader in other embodiments. Microprocessor 120 also can obtain location information of the identified cart 10 in embodiments in which a plurality of IR sensors 110 are distributed throughout an area. In embodiments in which IR sensors 110 are arranged only at a central cart corral, location information generally is not necessary because cart 10 is known to be in the corral but still may be provided.

Microprocessor 120 then issues a wheel failure alert comprising the unique shopping cart identifier if the sensor data for any one of the plurality of wheels exceeds the predefined thresholds or other alert rules are met or violated. This alert can be sent via notification system 140, which can provide a communicative coupling between system 100 and an employee communication system. Employee communication systems can comprise pagers, smartphones, walkie-talkies, computers, wearable devices, handheld scanning devices, tables, augmented reality (AR) systems, or other devices typically used by employees during work to carry out their tasks. Notification system 140 can route the alert to appropriate personnel via the employee communication system, such that the personnel can receive the cart identifier, notice that the cart requires attention, and (optionally) the location of the cart, and be dispatched to the cart location to take it out of service or take other action. The alert itself can comprise an SMS or text message, voicemail, email, other audible and/or visual alert, haptic alert, or other type of message that can be received and understood by personnel.

To aid in locating a particular cart, particularly in embodiments in which personnel is dispatched to remove a particular cart 10 from a common cart corral area that may hold tens or hundreds of carts, each cart 10 can be labeled prominently with the secondary identifier or a simplified identifier arranged for easy reading by human personnel rather than IR sensor 110 or another reader or scanner. For example, the cart can be labeled with a prominent cart number (e.g., CART 101), and the alert can comprise this identifier even if the unique identifier used by system 100 is more complicated or not apparent to the naked eye (e.g., when the unique identifier comprises an infrared watermark or machine-readable code). In other embodiments, each cart 10 can be equipped with an LED or other visual indicator that can be turned on or can change color when system 100 has identified cart 10 as requiring attention, making that cart 10 stand out among others in the area. An additional benefit of such a visual identifier is that customers can avoid carts with illuminated or, e.g., red LEDs if it is communicated to them that this means the cart 10 requires service and should not be used, avoiding situations in which personnel need some time to reach the cart corral and in the meantime a new customer has selected cart 10 and removed it from the corral. Still other ways of making the cart apparent to personnel and/or customers can be implemented in other embodiments.

In embodiments, notification system 140 can comprise part of communication system 130. In such an embodiment, communication system 130 can send the alerts and can itself be part of, comprise or be in communication with an employee communication system. Thus, in some embodiments system 100 can comprise an employee communication system.

In some embodiments, system 100 also can provide cart fleet diagnostic information. For example, daily, weekly, monthly or in some other time period, system 100 can provide a report summarizing cart state and identifying groups of carts needing attention or that may need attention soon (e.g., 8 carts are beginning to exhibit higher wheel temperatures that do not yet exceed the predetermined threshold, indicating that these 8 carts may be beginning to go bad but have not yet). Additional analytics can be provided, such as personnel response time to alerts, the number of alerts issued in a given time period, common characteristics of failing or failed carts (e.g., a common age, manufacturer, use in a particular area), and other information that can assist store personnel in managing a cart fleet and possibly avoiding further cart failures that have common causes. For example, analytics may enable a store to determine that carts commonly fail after so many hours, days, months or years of service, enabling the store to schedule replacement of carts before actual failure or have a suitable supply on hand to replace carts that do begin to fail.

Embodiments of system 10 comprising a plurality of IR sensors 110 distributed throughout an area also can be used to determine distances traveled by cart 10 and the amount of time taken to do so. For example, CART 101 can be detected by a first IR camera 112 as leaving the cart corral at 10:00 am and then is detected by a second IR camera 112 in aisle 10 at 10:02, by a third IR camera 112 in aisle 15 at 10:10, and at the checkout area by a fourth IR camera 112 at 10:15. This information, alone or in combination with purchase information from the POS system at the checkout area, can be used to analyze customer behaviors and paths taken through stores along with purchase patterns to adjust or improve store layouts, product placement, and other characteristics of a space.

In yet further embodiments, cart 10 can comprise additional features that provide data for correlation with wheel temperature data and/or sales data. For example, cart 10 can comprise a scale to weigh items placed in cart 10, which then can be correlated with wheel failure data, cart travel data, and/or sales data. In another embodiment, cart 10 can comprise an RFID reader that can read information from RFID tags on products placed in cart 10, from which data about cart usage, customer path, purchases and/or other factors can be determined.

A single-camera embodiment also may be able to determine approximate distances traveled by the cart, as wheels turning for a longer time are subject to more friction and therefore become hotter, which can be detected by the camera.

Figure 3:
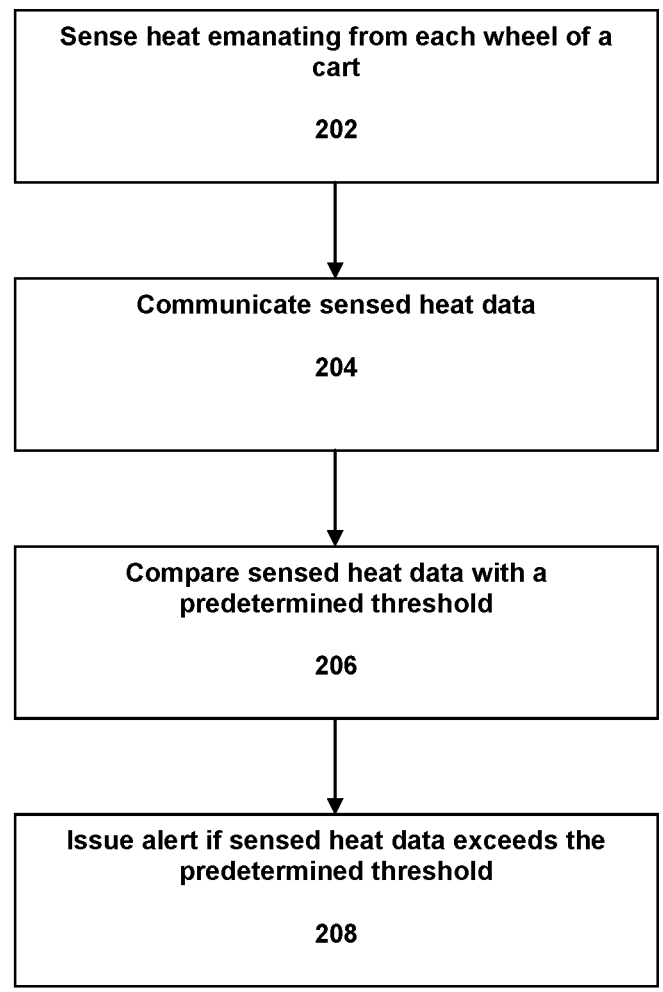
FIG. 3 is a method for detecting cart wheel failure according to an embodiment.

Referring to FIG. 3, an example method related to system 100 is depicted. At 202, an IR sensor 110 senses heat emanating from each wheel 12 of a shopping cart 10. At 204, IR sensor 110 communicates the sensed heat data and a cart identifier to microprocessor 120. Optionally, the cart identifier is omitted and instead communicated to microprocessor 120 by a separate scanner, reader or other device. At 206, microprocessor 120 compares the sensed heat data for each wheel 12 of cart 10 with a predetermined threshold. At 208, if microprocessor 120 determines that heat detected from at least one wheel 12 of cart 10 exceeds the predetermined threshold, microprocessor 120 issues an alert. The alert can be communicated partly or fully by system 100 to personnel and comprises the cart identifier and optionally the cart location.

Figure 4:
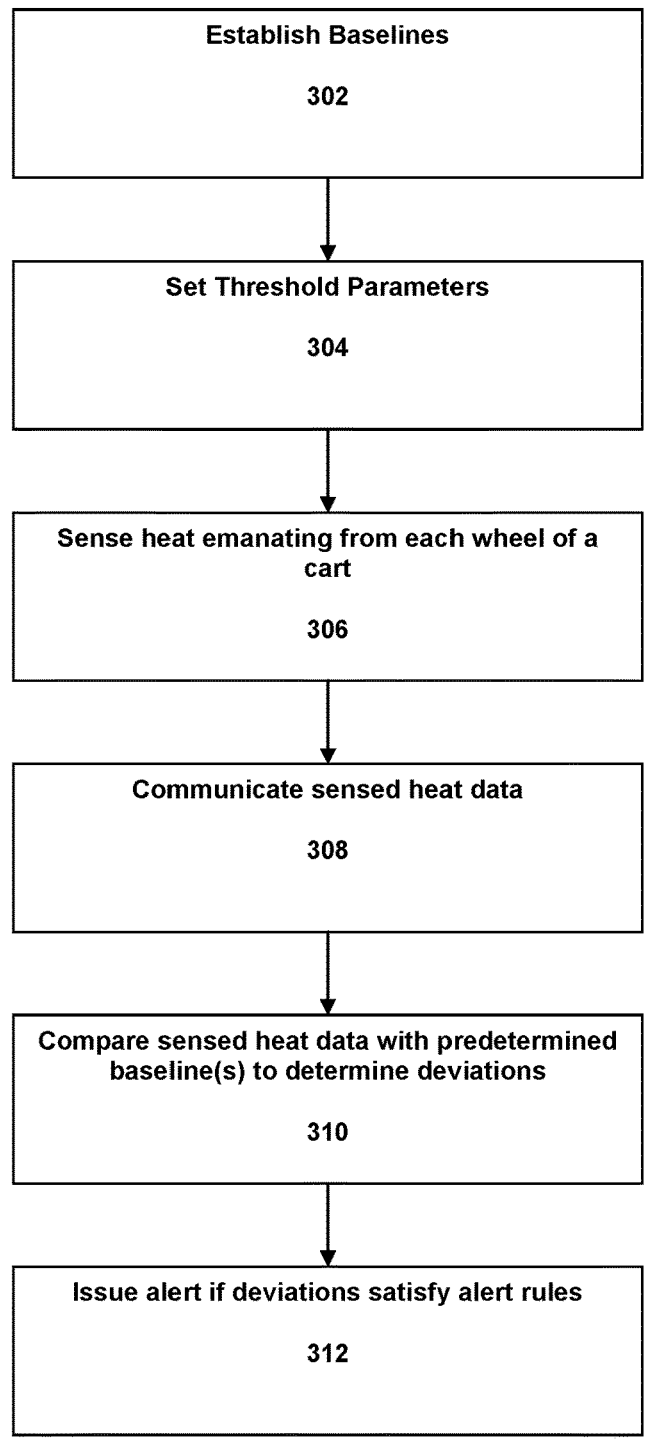
FIG. 4 is a method for detecting cart wheel failure according to an embodiment.

Referring to FIG. 4, another example method related to system 100 is depicted. At 302, baselines values are established. Baselines can be established automatically, or provided by the user. At 304, threshold parameters are set. The threshold parameters can be determined based on the baseline values, independently determined, or provided by the user. At 306, an IR sensor 110 senses heat emanating from each wheel 12 of a shopping cart 10. At 308, IR sensor 110 communicates the sensed heat data and a cart identifier to microprocessor 120. Optionally, the cart identifier is omitted and instead communicated to microprocessor 120 by a separate scanner, reader or other device. At 310, microprocessor 120 compares the sensed heat data for each wheel 12 of cart 10 with the baselines to determine one or more deviations. At 312, the microprocessor 120 uses the deviations and the threshold parameters and issues an alert if appropriate. The issued alert can be communicated partly or fully by system 100 to personnel and comprises the cart identifier and optionally the cart location.

In various embodiments, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but also to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A cart wheel failure detection system comprising:
   at least one sensor arranged physically apart from a cart so as to detect heat emanating from each of a plurality of wheels of the cart, the at least one sensor configured to detect a unique cart identifier disposed proximate at least one of the plurality of wheels, the unique cart identifier comprising a machine-readable marking exclusive to the cart from among a plurality of carts;
   a communication system configured to receive the unique cart identifier and sensor data of detected heat emanating from each of the plurality of wheels of the cart from the at least one sensor; and
   a microprocessor configured to receive the unique cart identifier and the sensor data of detected heat emanating from each of the plurality of wheels of the cart from the communication system, to compare the sensor data for each of the plurality of wheels to a predefined alert rule defining one or more threshold parameters indicative of pre-failure or failure of a cart wheel, and to transmit a wheel failure alert comprising the unique cart identifier if the sensor data for any one of the plurality of wheels satisfies the predefined alert rule.

2. The system of claim 1, wherein each of the one or more threshold parameters is selected from the group consisting of: a maximum temperature, a maximum rate of temperature increase, and a maximum similarity of the sensed data to a known heat distribution pattern.

3. The system of claim 1, wherein the microprocessor is further configured to determine at least one of the one or more threshold parameters based on a baseline determined based on previously measured baseline sensor data of at least one operational cart.

4. The system of claim 1, wherein the at least one sensor comprises an infrared sensor.

5. The system of claim 4, wherein the unique cart identifier comprises an infrared watermark.

6. The system of claim 1, wherein the unique cart identifier is disposed proximate each of the plurality of wheels of the cart.

7. The system of claim 6, wherein the unique cart identifier comprises a wheel identifier to localize each wheel on the cart.

8. The system of claim 7, wherein the wheel failure alert comprises the wheel identifier.

9. The system of claim 1, wherein the unique shopping cart identifier comprises a patterned metal portion of the cart.

10. The system of claim 1, wherein the at least one sensor is stationary and mounted proximate a cart holding area.

11. The system of claim 1, wherein the at least one sensor comprises a sensor network distributed throughout an area in which carts are used.

12. The system of claim 11, wherein the wheel failure alert comprises a location of the cart in the retail space determined from a location of the at least one sensor in the sensor network that detected the heat and the unique cart identifier.

13. The system of claim 11, wherein at least one of cart usage time or cart distance traveled is determined from locations of sensors in the sensor network that detect the unique cart identifier at different times.

14. The system of claim 1, wherein the at least one sensor is mounted less than about 12 inches above a surface on which the plurality of wheels of the cart roll.

15. The system of claim 14, wherein the at least one sensor is mounted less than about 6 inches above a surface on which the plurality of wheels of the cart roll.

16. The system of claim 1, wherein the communication system comprises a wireless communication system.

17. The system of claim 1, wherein the communication system comprises a wired communication system.

18. A method of detecting pre-failure or failure of a cart wheel comprising:
   arranging at least one sensor physically apart from a cart;
   detecting heat emanating from each of a plurality of wheels of the cart by the at least one sensor;
   detecting a unique cart identifier disposed proximate at least one of the plurality of wheels by the at least one sensor, the unique cart identifier comprising a machine-readable marking exclusive to the cart from among a plurality of carts;
   comparing data for each of the plurality of wheels from the at least one sensor to a predefined alert rule defining one or more threshold parameters indicative of pre-failure or failure of a cart wheel, each of the one or more threshold parameters is selected from the group consisting of: a maximum temperature, a maximum rate of temperature increase, and a maximum similarity of the sensed data to a known heat distribution pattern; and
   providing a wheel failure alert comprising the unique cart identifier if the data for any one of the plurality of wheels satisfies the alert rule in the comparing.

19. The system of claim 18, further comprising to determining at least one of the one or more threshold parameters based on a baseline determined based on previously measured baseline sensor data of at least one operational cart.

20. The method of claim 18, wherein the arranging further comprises mounting the at least one sensor in a stationary location proximate a cart holding area.

21. The method of claim 18, wherein the arranging further comprises mounting a plurality of sensors in stationary locations distributed throughout a space in which carts are used.

22. The method of claim 21, wherein the providing further comprises providing a location of the cart in the space, determined from a location of at least one of the plurality of sensors that detected the heat and the unique cart identifier.

23. The method of claim 21, further comprising determining at least one of cart usage time or cart distance traveled from locations of ones of the plurality of sensors that detect the unique cart identifier at different times.

24. The method of claim 18, further comprising forming the unique cart identifier in a metal portion of the cart.

\* \* \* \* \*